United States Patent [19]

Knapp et al.

[11] 4,279,305

[45] Jul. 21, 1981

[54] PROCESS FOR STIMULATING A WELL WITH A SALINE SURFACTANT SULFATE, ALKANOL AND ACID SYSTEM

[75] Inventors: Randolph H. Knapp, New Orleans, La.; Jimmie B. Lawson; Joseph Reisberg; David R. Thigpen; Harold J. Hill, all of Houston, Tex.

[73] Assignee: Shell Oil Company, Houston, Tex.

[21] Appl. No.: 153,465

[22] Filed: May 27, 1980

[51] Int. Cl.$^3$ .................. E21B 43/22; E21B 43/27
[52] U.S. Cl. .................. 166/307; 166/252; 166/271; 166/273
[58] Field of Search ............. 166/252, 271, 273, 274, 166/275, 305 R, 307; 252/8.55 D

[56] References Cited

U.S. PATENT DOCUMENTS

| | | | |
|---|---|---|---|
| 2,356,205 | 8/1944 | Blair, Jr. et al. | 166/305 R |
| 3,135,326 | 6/1964 | Santee | 166/273 X |
| 3,500,923 | 3/1970 | Reisberg | 166/274 |
| 3,515,214 | 6/1970 | Finch | 166/274 X |
| 3,568,772 | 3/1971 | Gogarty et al. | 166/273 |
| 3,648,775 | 3/1972 | Dixon | 166/307 |
| 3,712,377 | 1/1973 | Hill et al. | 166/252 |
| 3,819,520 | 6/1974 | Jones et al. | 166/307 X |
| 3,915,233 | 10/1975 | Slusser | 166/307 |
| 4,193,452 | 3/1980 | Wilson et al. | 166/274 |

*Primary Examiner*—Stephen J. Novosad
*Assistant Examiner*—George A. Suchfield

[57] ABSTRACT

The injectivity of an oil-containing reservoir is increased by injecting successive portions of a solution or slightly turbid dispersion of reservoir-tailored amounts of polyalkoxyalcohol sulfate surfactant and lower alkanol in highly saline aqueous liquid and a reservoir acidizing solution.

8 Claims, No Drawings

PROCESS FOR STIMULATING A WELL WITH A SALINE SURFACTANT SULFATE, ALKANOL AND ACID SYSTEM

BACKGROUND OF THE INVENTION

This invention relates to a process for treating a well by injecting a reservoir-tailored combination of fluids which increases the effective permeability to aqueous fluids within a subterranean reservoir which communicates with the well.

Numerous types of well treatments have been previously proposed for effecting such a well stimulation. For example, the J. Reisberg U.S. Pat. No. 3,500,923, which relates to an oil recovery process, describes injecting a dispersion of about 5% by weight of a polyalkoxyalcohol sulfate surfactant in an aqueous liquid containing from about 4 to 5 moles per liter of sodium chloride and discloses that such a highly saline surfactant system is an efficient oil-displacing fluid—although one in which the salt content is reduced to from about 1 to 1½ moles per liter is viscous but is inefficient for oil-displacement. The P. J. Raifsnyder U.S. Pat. Nos. 3,527,301 and 3,612,182, which also relate to oil recovery processes, describe injecting undiluted, or very concentrated, solutions of nonionic polyalkoxyalcohol surfactants (respectively, alone and in conjunction with a reservoir acidizing fluid) and disclose that such solutions are effective in causing a temporary selective plugging of the most permeable layers (or thief zones) of an inhomogeneous reservoir. U.S. Pat. No. 3,568,772, which relates to increasing the injectivity index of a well, describes injecting a micellar dispersion which contains less than 4% by weight (or less than 1.0 mole per liter) of an electrolyte such as sodium chloride ahead of an aqueous acid. U.S. Pat. No. 3,637,016, which also relates to increasing the injectivity of a well, describes injecting a soluble oil and water which contains less than about 1% by weight of sodium chloride. U.S. Pat. No. 3,946,812 which relates to an oil production process, discloses that injecting a polyalkoxyalcohol sulfate surfactant dissolved in an aqueous liquid in proportions providing . . . "a thickened, transparent, aqueous solution" . . . (column 3, lines 44 and 45) increases the sweep efficiency of a waterflood . . . "not by surfactant action but through the provision of a more favorable mobility and sweep of the reservoir" (column 3, line 68 to column 4, line 2). The H. J. Hill and D. R. Thigpen U.S. Pat. No. 3,712,377, which relates to an improved process for displacing oil within a subterranean reservoir, discloses that dilute aqueous surfactant systems should be tested regarding their tendency to form viscous emulsions when mixed with the oil within the reservoir and, if needed, an emulsion modifier, such as a lower alkanol, should be added to increase the ratio of the effective viscosity of the surfactant system to that of such emulsions.

Although such prior processes have been efficient in various individual situations, their efficiency is significantly affected by numerous physical and chemical properties of the reservoir and reservoir fluids—and those properties vary from one well to another. Thus, a formulation which is effective at one temperature is apt to be ineffective at another. A formulation which is effective with one reservoir oil is apt to be ineffective with another. And, further, the oil-displacing efficiencies are known to be affected by the rate of fluid injection, the composition of the water used for formulating the surfactant system, the composition of the water present in the reservoir interval to be treated, and the like.

SUMMARY OF THE INVENTION

The present invention relates to a well treating process for increasing the effective permeability to aqueous fluid of a subterranean reservoir which is in fluid communication with a well. Separate portions of fluids A and B are injected into the reservoir. Fluid A consists essentially of a highly saline aqueous solution or dispersion containing (a) from about 10 to 25% by weight of sodium chloride, or the sodium chloride equivalent of at least one other dissolved salt, (b) from about 1 to 10% by weight of at least one surface active polyalkoxyalcohol sulfate and (c) from about 0.5 to 5% by weight of a 4 to 7 carbon atom alkanol. Fluid B consists essentially of at least one reservoir acidizing solution which is capable of dissolving at least some component of the reservoir rock. The kinds and amounts of the compounds which are dissolved or dispersed in Fluid A are correlated relative to the physical and chemical properties of the reservoir being treated so that, at the reservoir temperature, the interfacial tension between fluid A and the reservoir oil is less than about 0.01 dynes per centimeter and, at the rate selected for the injection of fluid into the reservoir, the ratio between the effective viscosity of fluid A and that of its mixtures with the reservoir oil within the reservoir is sufficient to provide a substantially stable displacement of oil for a distance of from about 1 to 10 feet away from the well. The fluids A and B are injected so that they enter the same portion of the reservoir and at least one portion of fluid B is injected after at least one portion of fluid A.

The present process is particularly effective in treating an injection well into which a relatively large volume of aqueous liquid is to be injected at a selected rate (for example, to effect a waterflood oil recovery process, or a disposal of waste fluid, or the like). In such a treatment, the rate at which the fluids A and B are injected preferably approaches the rate at which the relatively large volume of aqueous liquid is to be injected at least to approximately the extent attainable by an injection pressure which is non-damaging to the well or the reservoir.

DESCRIPTION OF THE INVENTION

The present invention is, at least in part, premised on a discovery that an aqueous surfactant system which contains a relatively high proportion of both a dissolved salt and a dissolved or dispersed polyalkoxyalcohol sulfate surfactant plus a small but significant proportion of lower alkanol—when used in conjunction with an aqueous reservoir acidizing solution—is capable of providing (a) an unexpectedly large increase in the injectivity of a reservoir, and (b) is very versatile in being readily adjustable to provide an effective treatment at a significantly different temperature or with a significantly different oil or other fluid within the reservoir.

Numerous laboratory tests have been made of the efficiency of the highly saline polyalkoxyalcohol sulfate surfactant systems described in the Reisberg U.S. Pat. No. 3,500,923. Such tests used typical reservoir temperatures and typical reservoir oils and efficient oil-displacements were obtained when the surfactant systems were injected into oil-containing earth formations, such as reservoir cores. But, with respect to restoring an effective permeability to water equalling what was exhibited prior to an injection of oil, in many cases, it was found that only a fraction of the total potential increase in permeability was obtained. At present, no suitable explanation is available for such a failure to recover the total permeability.

However, in a field test of a well treatment with the present process, a 20-barrel slug of the present alkanol-containing highly saline sulfate surfactant system was injected into a 24-foot perforated zone of reservoir formation at a rate of 2 barrels per minute. During that vide the maximum attainable interfacial tension lowering activity (IFA) and/or has a tendency to form a two-layer system of immiscible liquids at a reservoir temperature (such as 77° F.), an increase in the proportion of the alkanol can increase both the IFA and the mutual solubility of the layers of the surfactant system.

However, such an alkanol concentration should be kept within the specified range. Too much alkanol can reduce the viscosity and thus reduce the efficiency of displacing a relatively viscous oil. These effects are shown by the data in Table 1.

TABLE NO. 1

PROPERTIES OF SYSTEMS CONTAINING FIVE WEIGHT PERCENT NEODOL 25-3S SURFACTANT SIXTEEN WEIGHT PERCENT SODIUM CHLORIDE AND VARYING AMOUNTS OF ISOBUTYL ALCOHOL

| SAMPLE NO. | 325 | 340 | 350 | 351 | 352 | 353 | 354 | 355 |
|---|---|---|---|---|---|---|---|---|
| Isobutyl Alcohol, Wt % | 0.0 | 0.5 | 0.75 | 1.0 | 1.25 | 1.50 | 1.75 | 2.00 |
| VE/VS @ 170° F.(1) | 0.3 | 0.5 | 1.5 | 1.4 | 1.4 | 2.2 | 1.3 | 1.6 |
| Number of Phases | | | | | | | | |
| In System @ 77° F. | 2 | 2 | 2 | 1 | 1 | 1 | 1 | 1 |
| @ 150° F. | 2 | 1 | 1 | 1 | 1 | 1 | 1 | 1 |
| @ 170° F. | 1 | | | | | | | |
| Interfacial Activity | | | | | | | | |
| @ 150° F.(2) | 7 | 7 | 8 | 9–10 | 10 | 10 | 10–20 | 20 |
| @ 170° F.(2) | 7 | | | | | | | |

(1)VE/VS Ratio of emulsion viscosity to system viscosity; 35% by volume Gulf Coast crude oil. Ratio is for viscosities at 7.3 Sec.$^{-1}$. The ratio values decrease at lower shear rates. For an efficient displacement without fingering, the value of such a ratio should be less than one.
(2)As evaluated by a testing system in which the activities are rated as: Maximum in range 10–20, over optimum above 20, and under optimum below 10.

injection the surface injection pressure increased from about 800 to 1200 psi. The surfactant system was followed by, respectively, about a 6-barrel salt water spacer fluid, 500 gallons of 10% HCl, and 1000 gallons of 7.5% HCl-1.5% HF mud acid. Unobviously, when the acid hit the perforations, the injection pressure needed for the 2-barrel per minute rate dropped to 200 psi. The well was then put on injection at rates as high as 6880 barrels of water per day before being choked back to a rate of 4800 barrels per day. And, similar responses have been obtained in two subsequent well treatments.

In an aqueous surfactant system of the above type, the presence of the specified type of lower alkanol provides an unobvious benefit which is not suggested by prior patents such as the Hill and Thigpen U.S. Pat. No. 3,712,377. The commercially available form of a particularly suitable polyalkoxyalcohol sulfate which is available from Shell Chemical Company under the trade name Neodol 25-3S, is difficult to disperse in salt water. However, when the surfactant as marketed (containing about 14 weight percent ethanol) is pre-blended with a relatively small amount of a 4 to 7 carbon atom lower alkanol, the resulting solution is readily dispersible in salt water.

In addition, within the presently specified range of alkanol concentration (i.e., about 0.5 to 7% by weight) it has now been discovered that, where the surfactant system contains less than enough dissolved salt to pro- It should be noted that if emulsions having viscosities higher than the parent system are generated in situ, the following oil-free portion of the slug may finger through and by-pass a significant amount of oil and surfactant. It is, therefore, desirable to use systems having emulsion-parent system viscosity ratios less than one.

Data in Table 1 show that an under-optimum and two-layer system (77° F.) containing 5% NEODOL ® 25-3S and 16% NaCl can be made single layer and near optimum by addition of 1% isobutyl alcohol (IBA). Addition of increasing amounts of IBA (up to about 2%) results in some improvement in interfacial activity but also results in steadily decreasing viscosity.

The data listed in Table 2 shows variations of interfacial activity with alcohol concentration regarding a particularly suitable example of such a surfactant system (containing about 17% sodium chloride and 5% NEODOL ® 25-3S surfactant dissolved in water containing the indicated proportions of isobutyl alcohol.

The data shows that, for the tested system, the interfacial activity is below optimum at zero IBA, reaches optimum at 0.75% IBA and remains in the optimum region through the maximum level (1.75%) tested. Emulsion viscosity is greater than system viscosity at 0.75% IBA but falls below system viscosity at 1% IBA. It remains equal to or below system viscosity up to 1.5% IBA. System viscosity itself peaks at 1% IBA but remains reasonably high through 1.5% IBA.

TABLE NO. 2

PROPERTIES OF SYSTEMS CONTAINING FIVE WEIGHT PERCENT NEODOL 25-3-S SURFACTANT, SEVENTEEN WEIGHT PERCENT SODIUM CHLORIDE AND VARYING AMOUNTS OF ISO BUTYL ALCOHOL

| SAMPLE NO. | 327 | 329 | 330 | 331 | 332 | 333 | 356 |
|---|---|---|---|---|---|---|---|
| Isobutyl Alcohol, Wt % | 0.0 | 0.5 | 0.75 | 1.0 | 1.25 | 1.50 | 1.75 |
| VE/VS @ 150° F.(1) | 0.4 | 2.1 | 1.9 | 0.9 | 0.8 | 0.9 | |
| VE/VS @ 170° F.(1) | 0.4 | 1.7 | 1.5 | 0.9 | 0.4 | 1.0 | 1.1 |

TABLE NO. 2-continued

PROPERTIES OF SYSTEMS CONTAINING FIVE
WEIGHT PERCENT NEODOL 25-3-S SURFACTANT,
SEVENTEEN WEIGHT PERCENT SODIUM CHLORIDE AND
VARYING AMOUNTS OF ISO BUTYL ALCOHOL

| SAMPLE NO. | 327 | 329 | 330 | 331 | 332 | 333 | 356 |
|---|---|---|---|---|---|---|---|
| Number of Phases | | | | | | | |
| In System @ 77° F. | 2 | 1 | 1 | 1 | 1 | 1 | 1 |
| @ 150° F. | 1 | 1 | 1 | 1 | 1 | 1 | 2 |
| @ 170° F. | 1 | | | | | | |
| Interfacial Activity | | | | | | | |
| @ 150° F.[2] | 7–8 | 9–10 | 10 | 10–20 | 10–20 | 20 | 20 |
| @ 170° F.[2] | 7–8 | | | | | | |

[1]VE/VS ratio of emulsion viscosity to system viscosity; 35% by volume Gulf Coast crude oil. Ratio is for viscosities at 7.3 Sec.$^{-1}$. The ratio values decrease at lower shear rates. For an efficient displacement without fingering, the value of such a ratio should be less than one.
[2]As evaluated by a testing system in which the activities are rates as: Maximum in range 10-20, over optimum above 20, and under optimum below 10.

The data shown in Table 3, particularly with respect to samples 168 and 978, shows the unpredictable nature of emulsion viscosities for certain compositions of the parent system. Although both systems were prepared and handled as nearly as possible, in an identical fashion, one emulsion was extremely viscous while the other was less viscous than the parent system. For practical oil field application of a surfactant system such unpredictable behavior should not be tolerated. The unpredictability emphasizes the non-obvious nature of the high degree of success exhibited by the optimum compositions of the present invention.

TABLE NO. 3

PROPERTIES OF SYSTEMS CONTAINING FIVE WEIGHT PERCENT
NEODOL 25-3S SURFACTANT, TWENTY WEIGHT PERCENT
SODIUM CHLORIDE AND VARYING AMOUNTS OF ISO BUTYL ALCOHOL

| SAMPLE NO. | 323 | 205 | 196 | 197 | 168 | 978 | 198 | 199 |
|---|---|---|---|---|---|---|---|---|
| Isobutyl Alcohol Wt % | 0.00 | 0.00 | 0.50 | 0.75 | 1.00 | 1.00 | 1.25 | 1.50 |
| VE/VS @ 150° F.[1] | >2.0 | >2.0 | 1.2 | 0.3[3] | 0.4[3] | | | |
| VE/VS @ 170° F.[1] | 1.1 | >2.0 | 1.0 | 1.2 | 0.7 | [4] | | |
| Number of Phases | | | | | | | | |
| in System @ 77° F. | 1 | 1 | 1 | 1 | 1 | 1 | 1 | 1 |
| @ 150° F. | 1 | 1 | 1 | 1 | 1 | 1 | 1 | 2 |
| @ 170° F. | 1 | 1 | 1 | 1 | 1 | 1 | 1 | 2 |
| Interfacial Activity | | | | | | | | |
| @ 150° F.[2] | 20 | 10 | 10–20 | 10–20 | 10–20 | 10–20 | 10–20 | 10–20 |
| @ 170° F.[2] | 20 | 10 | 10–20 | 10–20 | 10–20 | 10–20 | 10–20 | 10–20 |

[1]VE/VS ratio of emulsion viscosity to system viscosity; 35% by volume Gulf Coast crude oil. Ratio is for viscosities at 7.3 Sec.$^{-1}$. The ratio values decrease at lower shear rates. For an efficient displacement without fingering, the value of such a ratio should be less than one.
[2]As evaluated by a testing system in which the activities are rates as: Maximum in range 10–20, over optimum above 20, and under optimum below 10.
[3]@ 14.6 Sec$^{-1}$ shear rate
[4]Emulsion viscosity off scale except 1580 Cp @ 150° F. and 0.365 Sec$^{-1}$.

Tables 4 and 5 show the effects (regarding a specified oil and temperature) of replacing isobutyl alcohol with pentyl alcohol.

TABLE NO. 4

PROPERTIES OF SYSTEMS CONTAINING FIVE WEIGHT PERCENT
NEODOL 25-3S SURFACTANT, SEVENTEEN WEIGHT PERCENT
SODIUM CHLORIDE AND VARYING AMOUNTS OF PENTYL ALCOHOL

| SAMPLE NO. | 327 | 320 | 340 | 341 | 342 | 343 |
|---|---|---|---|---|---|---|
| Pentyl Alcohol, Wt % | 0.00 | 0.25 | 0.50 | 0.75 | 1.00 | 1.25 |
| VE/VS @ 150° F.[1] | 0.4 | | | | | |
| VE/VS @ 170° F.[1] | 0.4 | >2.0 | 1.2 | >0.7 | 1.3 | |
| Number of Phases In System @ 77° F. | 2 | 1 | 1 | 1 | 1 | 2 |
| @ 150° F. | 1 | 1 | 1 | 1 | 1 | 2 |
| @ 170° F. | 1 | | | | | |
| Interfacial Activity @ 150° F.[2] | 7–8 | 9 | 10 | 10–20 | 10–20 | |
| @ 170° F.[2] | 7–8 | | | | | |

[1]VE/VS ratio of emulsion viscosity to system viscosity; 35% by volume Gulf Coast crude oil. Ratio is for viscosities at 7.3 Sec$^{-1}$. The ratio values decrease at lower shear rates. For an efficient displacement without fingering, the value of such a ratio should be less than one.
[2]As evaluated by a testing system in which the activities are rates as: Maximum in range 10-20, over optimum above 20, and under optimum below 10.

TABLE NO. 5

PROPERTIES OF SYSTEMS CONTAINING FIVE WEIGHT PERCENT
NEODOL 25-3S SURFACTANT, NINETEEN WEIGHT PERCENT
SODIUM CHLORIDE AND VARYING AMOUNTS OF PENTYL ALCOHOL

| SAMPLE NO. | 321 | 344 | 345 | 346 | 347 | 348 |
|---|---|---|---|---|---|---|
| Pentyl Alcohol, wt % | 0.00 | 0.25 | 0.50 | 0.75 | 1.0 | 1.25 |

TABLE NO. 5-continued
PROPERTIES OF SYSTEMS CONTAINING FIVE WEIGHT PERCENT
NEODOL 25-3S SURFACTANT, NINETEEN WEIGHT PERCENT
SODIUM CHLORIDE AND VARYING AMOUNTS OF PENTYL ALCOHOL

| SAMPLE NO. | 321 | 344 | 345 | 346 | 347 | 348 |
|---|---|---|---|---|---|---|
| VE/VS @ 150° F.[1] | >1.3 | >1.5 | 0.5 | 1.1 | | |
| VE/VS @ 170° F.[1] | 1.2 | 1.5 | 0.1 | >1.4 | 0.3 | |
| Number of Phases in System @ 77° F. | 1 | 1 | 1 | 1 | 1 | 2 |
| @ 150° F. | 1 | 1 | 1 | 1 | 2 | 2 |
| @ 170° F. | 1 | | | | | |
| Interfacial Activity @ 150° F.[2] | 10 | 10–20 | 10–20 | 10–20 | 20 | 20 |
| @ 170° F.[2] | 10–20 | | | | | |

[1]VE/VS ratio of emulsion viscosity to system viscosity; 35% by volume Gulf Coast crude oil. Ratio is for viscosities at 7.3 Sec.$^{-1}$. The ratio values decrease at lower shear rates. For an efficient displacement without fingering, the value of such a ratio should be less than one.
[2]As evaluated by a testing system in which the activities are rates as: Maximum in range 10–20, over optimum above 20, and under optimum below 10.

Table 6 shows the results of laboratory flooding experiments carried out in 10-inch long Berea cores. It should be noted that, as indicated by experiments 981 and 989, the differences in the effectiveness of the two systems due to differences in alkanol content is capable of totally masking significant differences in the capillary properties of the earth formations being treated.

TABLE NO. 6
FLOW EXPERIMENTS: MAIN PASS BLOCK 69 CRUDE OIL
Cores: 10″l × 2″d Berea Sandstone
Chemical Flood: 5% NEODOL 25-3S surfactant plus NaCl and Isobutyl Alcohol as indicated in Table
Flood Rates: Initial Waterflood to $S_{or}$ at 1–2 ft/day. Final Waterflood, chemical flood and salt water drive @ 20 ft/day.

| EXPERIMENT NO. | 978 | 981 | 989 | 993 | 990 |
|---|---|---|---|---|---|
| Core Permeability, Md | 248 | 644 | 160 | 365 | 300 |
| Core Porosity, Fraction pv[a] | 0.19 | 0.21 | 0.19 | 0.20 | 0.20 |
| Residual Oil Saturation Fraction pv | 0.41 | 0.36 | 0.42 | 0.40 | 0.38 |
| Permeability at $S_{or}$ | 30. | 49. | 7.3 | 20. | 16. |
| NaCl in Chemical Flood, Wt % | 20.0 | 18.0 | 18.0 | 17.0 | 17.0 |
| Isobutyl Alcohol in Slug, Wt % | 1.0 | 1.25 | 0.00 | 1.25 | 1.25 |
| Viscosity of Slug, Cp @ 100 Sec$^{-1}$ Shear rate | 13 | 9.0 | 8.0 | 10.5 | 8.0 |
| Viscosity of Oil, Cp | 12.5[c] | 12.5[c] | 12.5[c] | 12.5[c] | 12.5 |
| Viscosity of Emulsion, Cp @ 100 Sec$^{-1}$ Shear rate | [b] | 8.0 | 10.0 | 10.5 | 6.0 |
| Temperature °F. | 150 | 150 | 150 | 150 | 170 |
| Volume Chemical Flood, pv | 4.14 | 3.96 | 6.93 | 4.25 | 6.2 |
| Volume of Drive Solution, pv | 2.98 | 1.86 | 7.35 | 3.21 | 4.1 |
| $S_{orc}$ at 1 pv Injection, pv | 0.14 | 0.17 | 0.18 | 0.19 | 0.15 |
| $S_{orc}$ at 1.5 pv Injection, pv | 0.11 | 0.05 | 0.12 | 0.08 | 0.07 |
| $S_{orc}$ at 2.0 pv Injection, pv | 0.10 | 0.04 | 0.10 | 0.05 | 0.05 |
| $S_{orc}$ at 2.5 pv Injection, pv | 0.09 | 0.02 | 0.09 | 0.01 | 0.02 |
| $S_{orc}$ at 3.0 pv injection, pv | 0.08 | 0.02 | 0.08 | 0.00 | 0.01 |
| $S_{orc}$ Final fraction pv | 0.07 | 0.02 | 0.07 | 0.00 | 0.00 |
| Permeability After Floods, Md | 72.0 | 358 | 55.0 | 164 | 130 |

[a]Pore Volume
[b]Off scale except 1580 Cp @ 0.365 Sec$^{-1}$ shear rate.
[c]Crude Oil viscosity @ 170° F.
[d]Residual oil saturation after injection of specified pore volume of fluid.

Table 7 shows the effects of temperature and crude oil properties on the interfacial activity of the present type of highly saline surface active sulfate and alcohol surfactant system.

TABLE 7
INTERFACIAL ACTIVITY OF NEODOL 25-3S
SURFACTANT SYSTEM WITH VARIOUS CRUDE OILS
AT VARIOUS TEMPERATURES
SYSTEM:[1] 5% NEODOL 25-3S SURFACTANT
17% NaCl, 1.25% ISOBUTYL ALCOHOL

| | Emulsion Grade [2] at | | |
|---|---|---|---|
| CRUDE OIL FROM | 77° F. | 150° F. | 200° F. |
| Eldorado, Kansas | 9 | 10–20 | 22 |
| South Pass, La. | 8 | 10+ | 20 |
| Mercy, Texas | 10–20 | 10–20 | 10–20 |
| Dune Ridge, Colorado | 9 | 10 | 22 |
| Seeligson, Texas | 10–20 | 10–20 | 10–20 |
| Ventura, California | 7–8 | 23 | 24 |
| Wasson, Texas | 9–10 | 21 | 24 |
| Eugene Island, La. | 9 | 10–20 | 10–20 |
| Main Pass, La. | 8 | 9–10 | 22 |
| Coalingua, California | 8 | 21 | 21 |
| Weeks Island, La. | 10 | 20 | 21 |
| Benton, Illinois | 10 | 10–20 | 10–20 |
| South Pass, Louisiana | 10 | 10–20 | 10–20 |

[1]All parent systems appeared single layer at all three temperatures.
[2]Emulsion grade is interfacial activity as evaluated by a testing system in which the activities are rated as follows: Maximum in range 10–20, over optimum above 20, and under optimum below 10.

FIELD TEST EXAMPLE

A recent turnaround to a water injector of an East Bay Gulf Coast pressure-depleted oil producer utilized the present viscous surfactant and acid combination treatment to remove oil from the near well bore formation for improved injectivity. The treatment was apparently responsible for an unusually high sustained injection rate of 4800 BWPD into 24 feet of perforations. Assuming that injectivity would equal the former productivity, an injection rate of around 2000 BWPD had been expected in this well.

The surfactant system utilized had the following composition:
5.00% w Neodol 25-3S surfactant
1.25% w Isobutyl Alcohol
17.00% w NaCl
76.75% w Fresh water The Neodol 25-3S and IBA were preblended and shipped in 30-gallon drums containing 200 pounds of Neodol 25-3S and 50 pounds of IBA. A 10-barrel batch of the present surfactant system is made from 30 gallons of the Neodol/IBA blend, for example, by placing 8.5 barrels fresh water in a blender, adding 650 pounds NaCl and dissolving, adding and dispersing the Neodol/IBA blend-while avoiding entrainment of air-and allowing the system to stand for at least about one hour before pumping.

The viscosity of such a surfactant system is about 32 cp at 90° F. and 25 cp at 100° F. of 7.3 sec.$^{-1}$. When the 20-barrel treatment was injected into the 24 feet of perforations of 2 barrels per minute, the surface injection pressure increased from 800 psi to 1200 psi. The surfactant system was displaced with a 6-barrel salt water spacer followed with 500 gallons of 10% HCl and 1000 gallons of "7½-1½" mud acid. When the acid hit the perforations, the pressure at 2 barrles per minute dropped to 200 psi. The well was then put on injection at rates as high as 6880 BWPD before being choked back to 4800 BWPD.

SUITABLE COMPOSITIONS AND TECHNIQUES

In a preferred procedure for formulating the solutions or dispersions to be compounded and injected, each formulation should be based on information regarding (1) the chemical composition of the reservoir crude oil and the water available at the well site for use in such fluids, (2) the borehole temperature at the depth to be treated, (3) the reservoir temperature within the zone to be treated, (4) the injection rates to be used (5) the chemical composition of the water expected to be present within the treated interval of the reservoir at the time the treatment fluids are injected and (6) an estimate of the treatment fluid viscosity needed to provide a viscously stable surfactant containing system-to-oil displacement front. Known types of a laboratory evaluation of the fluids being formulated can be utilized to ensure that the selected composition (1) is interfacially active against the reservoir crude at both borehole conditions and the temperature in the reservoir within the interval to be treated (2) the highly saline aqueous solution or dispersion of salt, surfactant and alkanol does not form an unduly viscous emulsion when mixed with the reservoir crude in any proportion at either the borehole or reservoir temperature, and (3) that surfactant system exhibits an adequate effective viscosity at the selected fluid injection rate to provide a substantially stable displacement of the reservoir oil within the zone to be treated.

The polyalkoxyalcohol sulfate surfactants and relatively highly saline aqueous liquids which are suitable for use in the present solutions or dispersion of surfactant, salt and alkanol include those of the sulfate surfactants described in the Resiberg U.S. Pat. No. 3,500,923 which are compatible and effective with the fluids in the reservoir to be treated at the reservoir temperature. The disclosures of that Resiberg patent are incorporated herein by cross reference. Where a commercially available polyalkoxyalcohol sulfate (such as the Neodol 25-3S sulfate available from Shell Chemical Company) contains significant proportions of a lower alcohol (such as ethanol) and significantly less than 100% active ingredients (such as 50% by weight), the concentrations of the commercially available material which are added to the present solution or dispersion should be those which contain from about 2 to 15% of the active sulfate component. In addition, such a sulfate should be mixed with an amount of 4 to 7 carbon atom alkanol providing a total 4-7 carbon atom alkanol content of from about 0.5 to 5% by weight of the solution or dispersion.

A sodium or ammonium salt such as the Neodol 25-3S sulfate typifies a particularly suitable surfactant for use in the present process.

The aqueous liquid used in formulating the present type of surfactant system is preferably a locally available water which contains or is modified to contain an amount of salt at least equivalent with respect to sodium chloride content of from about 10 to 25% by weight. The type and proportion of the multivalent ion content of that aqueous liquid is preferably substantially the same as that of the water within the reservoir zone to be treated, or sufficiently close to such a composition as to avoid any significant change in salt content due to dilution and/or ion-exchange reactions within the reservoir.

Lower alkanols which are suitable for addition to the highly saline aqueous solutions or dispersions of surfactant can be substantially any of the 4–7 carbon atom-containing alkanols described in the Hill and Thigpen U.S. Pat. No. 3,712,377. The disclosures of that patent are incorporated herein by cross-reference. Isobutyl alcohol is particularly suitable alkanol for use in the present process.

The reservoir acidizing solution used in the present process can be substantially any that is capable of dissolving at least one component of the reservoir rock. Aqueous hydrochloric acid and aqueous mixtures of hydrochloric and hydrofluoric acids are particularly suitable acidizing solutions for use in the present process.

In a particularly suitable embodiment of the present process, the aqueous surfactant system consists essentially of a solution or dispersion within an aqueous liquid of (a) from about 4 to 7% by weight of a polyalkoxyalcohol sulfate of a mixture of aliphatic alcohols containing about 12 to 15 carbon atoms and containing an average of from about 2 to 4 ethoxy groups per sulfate molecule (b) from about 0.5 to 2% by weight of an alkanol containing from about 4 to 57 carbon atoms and (c) from about 15 to 20% by weight of sodium chloride or the sodium chloride equivalent of other dissolved salts.

If the electrolyte content of the aqueous liquid in the near-well portion of the reservoir is not already known, it may be desirable to measure or determine the total dissolved salt concentration and the ratio of multivalent to monovalent ions in that liquid. Such determinations can readily be made by means of commercially available methods and devices.

An evaluation is preferably made regarding at least one surfactant system formulation of the type to be used. The surfactant system salinity should be at least sufficiently like that of the aqueous liquid in the near-well portion of the reservoir to avoid significant changes in its composition (e.g., due to dilution, chemical interaction or ion exchange) while it is flowing through the near-well portion of the reservoir. The surfactant system should also have an effective viscosity at least nearly equalling that of the reservoir oil at the reservoir temperature as well as having an IFA activity conducive to an efficient displacement of the reservoir oil at the reservoir temperature. Such salinity and viscosity properties can be readily measured by means of currently available methods and devices.

If desired, the oil-displacing efficiency of such a surfactant system can also be measured by conventional means. For example, measurements can be made of the interfacial tension between the surfactant system and the reservoir oil (or an oil equivalent to it) at the reservoir temperature. In general, a surfactant system which is sufficiently active to be effective provides an interfacial tension of less than about 0.01 dyne per centimeter between it and the oil.

We have also found that suitable evaluations of the present surfactant systems can be conducted by the following procedure:

1. The system to be tested is placed in a sealable tube. An approximately equal volume of the reservoir oil (or an oil substantially equivalent to it) is layered over the surfactant and the tube is sealed.

2. The sealed tube containing the layered surfactant and oil is kept substantially static at substantially the reservoir temperature and allowed to come to temperature equilibrium.

3. The so-equilibriated tube is gently tilted while the behavior of the oil/water interface is observed. An experienced eye can discern whether or not the oil/water interfacial tension is low enough to be effective for oil displacement. Where this is so, such a tilting of the tube tends to disperse the oil in very thin stringers which do not quickly break up into droplets and/or small droplets which are easily deformed by the shearing action of the gentle motion of the fluids.

4. The sealed tube is then shaken while observations are made. It should be noted whether the oil or water phase is continuous, and whether, and to what extent, the color is changed. A lightening of the color with increasing salt concentration tends to indicate a near optimum IFA while a darkening tends to indicate an increasingly over-optimum salinity. The size of the dispersed droplets should also be noted. The emulsions may be graded 1 to 10 if the water-phase is continuous and from 20 to 30 if the oil-phase is continuous.

The surfactant systems which are particularly desirable from emulsions which exhibit relatively short emulsion breaking times and low effective viscosities. Where such an emulsion breaks quickly or has a relatively low effective viscosity at the reservoir temperature, the ratio of the effective viscosity of the surfactant system to that of the emulsions formed by any of its mixtures with the reservoir oil tends to be high. And this makes it likely that the injection of the surfactant system will provide a stable displacement of the reservoir oil and can remove substantially all of the oil from the near-well zone of the reservoir.

Experience with such measuring and grading procedures has indicated that surfactant systems which provide water-continuous emulsions with values near 10 tend to exhibit reproducibly high efficiencies in comparable tests of the displacement of oil from cores.

In addition, in order to insure the absence of any intermingling which might affect the properties of the surfactant system and/or the acidizing solution, an aqueous saline liquid buffer is preferably injected between successively injected portions of the surfactant system and the acid. Such a buffer preferably has a salinity which is at least sufficiently like that of the surfactant system salinity to avoid any significant change in composition due to dilution, chemical interaction, and/or ionic-exchange reactions within the reservoir. The volume of such a buffer is preferably sufficient to keep the surfactant system and acid solutions apart throughout their passage through the well and into the reservoir.

Where the well being treated is a production well, after the last portion of the highly saline sulfate surfactant system has been injected and followed by a reservoir acidizing fluid, the injected fluids are preferably kept substantially static for a time at least sufficient to allow a significant decrease in the viscosity of the surfactant system. Such a viscosity decrease results from a hydrolysis of the sulfate surfactant and the rate of that hydrolysis increases with increases in the temperature and the concentration of strong acid in contact with the surfactant. After a time at least sufficient for the effective viscosity of the surfactant to diminish to one conducive to the production of fluid from the well, the well is returned to fluid production.

What is claimed is:

1. A well treating process comprising:
    injecting fluid at a selected rate into a subterranean reservoir in fluid communication with the well;
    including in the injected fluid separate portions of fluid A, which consists essentially of a highly saline aqueous solution or dispersion that contains from about 10 to 25% by weight of sodium chloride or the sodium chloride equivalent of other dissolved salts, from about 2 to 15% by weight of at least one surface active polyalkoxyalcohol sulfate and from about 0.5 to 5% by weight of at least one 4 to 7 carbon atom alkanol, and fluid B, which consists essentially of at least one reservoir acidizing solution which is capable of dissolving at least one component of the reservoir rock;
    correlating the kinds and amounts of the compounds dissolved or dispersed within fluid A relative to physical and chemical properties of the reservoir and reservoir fluids so that, at the reservoir temperature, the interfacial tension between fluid A and the reservoir oil is low enough for an efficient displacement of that oil and, at the selected rate of fluid injection, the ratios between the effective viscosity of fluid A and mixtures of fluid A and the reservoir oil are high enough to maintain a substantially stable displacement of the reservoir oil within the reservoir for a distance of from about 1 to 10 feet from the well; and,
    injecting at least one portion of fluid B following an injection of fluid A into the same portion of the reservoir.

2. The process of claim 1 in which the well being treated is an injection well and the rate at which fluid is injected approaches the rate at which an aqueous liquid is to be subsequently injected into the well at least substantially to the extent attainable in response to an injection pressure which is non-damaging to the well or the reservoir.

3. The process of claims 1 or 2 in which each pair of portions of fluids A and B are spaced apart by a portion of an aqueous saline liquid which (a) is substantially immiscible with and inert to those fluids and the fluids in the reservoir interval to be treated and (b) is present in a volume sufficient to prevent a significant mixing of the fluids A and B within the borehole of the well.

4. The process of claims 1, 2 or 3 in which the polyalkoxyalcohol sulfate is a mixture of 12 to 15 carbon atom aliphatic alcohols containing an average of about 2 to 4 ethoxy groups per molecule and the alkanol is isobutanol.

5. The process of claim 1 in which the well being treated is a production well and, after the injection of the last portion of the solutions A and B, the effective viscosity of fluid A is allowed to diminish to at least an extent at which fluid can be produced from the well, and the well is returned to fluid production.

6. A well treating process for increasing the effective permeability to water of a subterranean reservoir comprising:
compounding an aqueous surfactant system consisting essentially of a solution or dispersion within an aqueous liquid of (a) from about 4 to 7% by weight of a polyalkoxyalcohol sulfate of mixed aliphatic alcohols containing from about 12 to 15 carbon atoms and containing an average of from about 2 to 4 ethoxy groups per sulfate molecule (b) from about 0.5 to 2% by weight of an alkanol containing from about 4 to 7 carbon atoms and (c) from about 15 to 20% by weight of sodium chloride or the sodium equivalent of other dissolved salt;
adjusting the relative proportions of the surfactant system components so that when that system is injected into the reservoir at the selected rate (a) the salinity of the system is sufficiently like that of the aqueous liquid within the near-well portion of the reservoir to avoid any significant change in surfactant system composition due to dilution, chemical interaction or ion-exchange reactions and (b) the effective viscosity and interfacial tension activity of the surfactant system in contact with the reservoir oil at the reservoir temperature are conducive to a substantially stable displacement of substantially all of the reservoir oil within the near-well portion of the reservoir;
injecting at least enough of the surfactant system at the selected rate to displace at least a significant proportion of the reservoir oil from the near-well portion of the reservoir; and
injecting at least enough reservoir acidizing solution to contact at least substantially all of the near-well portion of the reservoir that was contacted by the injected surfactant system.

7. The process of claim 6 in which a substantially inert aqueous liquid buffer having a salinity at least substantially equivalent to that of the aqueous surfactant system is injected between each pair of successively injected portions of aqueous surfactant system and reservoir acidizing solution.

8. The process of claims 6 or 7 in which the well is an injection well through which an aqueous fluid is to be injected at a selected relatively high rate and the rates at which the surfactant system and the acidizing solution are injected approximate that relatively high rate at least to substantially the extent attainable in response to an injection pressure which is nondamaging to the components of the well or reservoir.

* * * * *